United States Patent [19]
Skalski

[11] Patent Number: 5,467,243
[45] Date of Patent: Nov. 14, 1995

[54] ELECTROMAGNET CONTROL SYSTEM

[75] Inventor: Clement A. Skalski, Avon, Conn.

[73] Assignee: Otis Elevator Company, Farmington, Conn.

[21] Appl. No.: 128,924

[22] Filed: Sep. 29, 1993

[51] Int. Cl.⁶ .................................................. H02N 15/00
[52] U.S. Cl. ............................................ 361/143; 361/146
[58] Field of Search ....................................... 361/143, 144, 361/145, 139, 146, 152, 206, 209, 185; 335/289–295

[56] References Cited

U.S. PATENT DOCUMENTS 3,857,081  12/1974  Gebelein, Jr. ..................... 335/215 X
4,935,838   6/1990  Barger et al. ......................... 361/148
5,243,491   9/1993  Van Eijk et al. ..................... 361/144
5,345,359   9/1994  Konstanzer ........................... 361/152
5,359,490  10/1994  Oguro .................................. 361/144

Primary Examiner—A. D. Pellinen
Assistant Examiner—Fritz M. Fleming

[57] ABSTRACT

Alternating current provided at an angular frequency ($\omega$) for powering an electromagnet force actuator having a leakage inductance ($L_1$) whereby the alternating current is controlled by a voltage reference and a feedback signal indicative of the controlled current and amplified at a gain factor ($K_1$) having a magnitude greater than or equal to the leakage inductance ($L_1$) times the angular frequency ($\omega$), whereby the electromagnet has a flat or positive spring rate.

8 Claims, 4 Drawing Sheets

FIG. 1
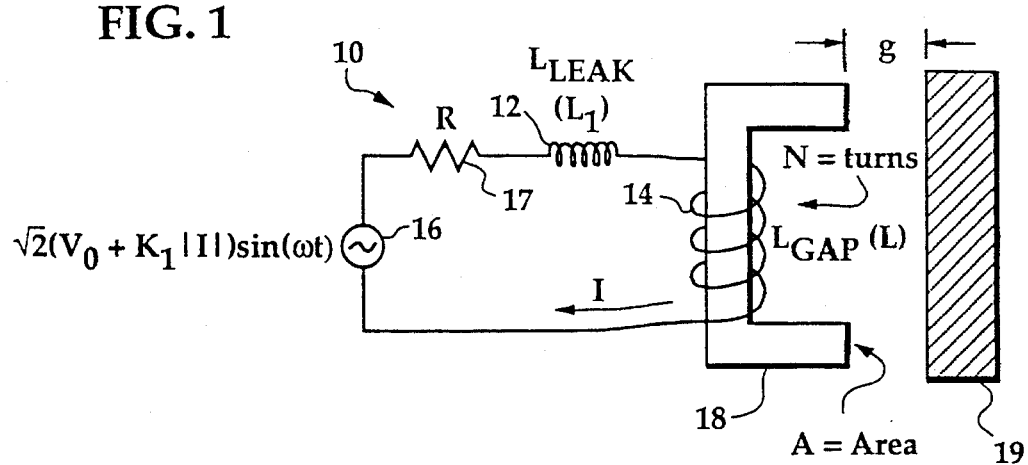
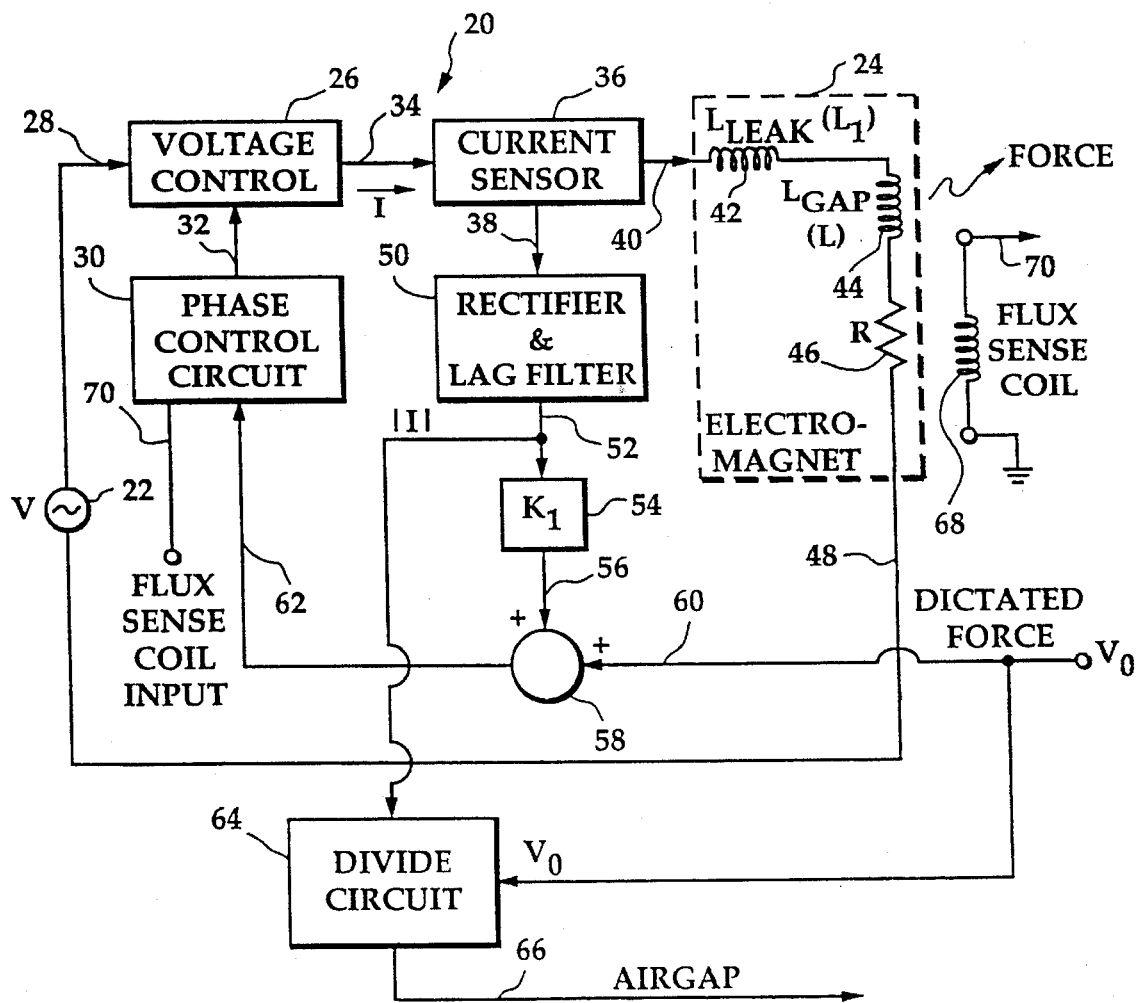
FIG. 2

FIG. 3(a) $K_1 = 0, 7.16, 7.3$

ELECTROMAGNET CONTROL SYSTEM

TECHNICAL FIELD

This invention relates to electromagnet control systems and, more particularly, to an electromagnet force actuator driven by alternating current.

BACKGROUND OF THE INVENTION

The application of a sinusoidal voltage (AC) to an electromagnet has significant advantages over applying a current directly (DC). However, the leakage inductance and coil resistance of the magnet will result in a force-gap characteristic that exhibits a negative spring rate.

A negative spring rate for a force generator makes it more difficult to use in a control system than one with a flat (zero) spring rate or a positive spring rate. For example, an electromagnet without stabilization cannot be used to levitate a mass. A magnet with positive spring rate can successfully levitate an iron mass.

DISCLOSURE OF INVENTION

An object of the present invention is to provide an electromagnet whose force characteristic is essentially independent of the air gap.

Another object of the present invention is to provide an electromagnet force actuator which has a zero or positive spring rate.

According to the present invention, an electromagnet is energized by voltage control of the electromagnet using AC. power.

In further accord with the present invention, the voltage is controlled using sensed RMS current through the electromagnet to obtain a flat or positive spring rate (force vs. gap characteristic).

In still further accord with the present invention, variations in leakage inductance with air gap and saturation of iron may be accounted for in any implementation of the present invention.

In accord still further with the present invention, the sensed current may be used to obtain a signal proportional to the air gap.

In accordance still further with the present invention, an additional signal may be provided by a flux sense coil to correct for saturation in a highly saturated system.

According still further with the present invention, the AC voltage provided to the electromagnet may be controlled using a solid state relay such as a triac, inverse-parallel silicon controlled rectifiers (SCRs), saturable reactors, a high frequency pulse width modulated (PWM) single-phase inverter, or the like. This latter solution would permit use of more than 60 cycle AC power for the fundamental excitation frequency of the electromagnet. This could be desirable to minimize vibrations in certain applications.

According still further to the present invention, feedback of a current rate signal, along with a current signal can be used to provide electromechanical damping.

Feedback of flux, according still further to the present invention, can also be used for the purpose of damping mechanical motion.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 1 shows an electromagnet driven by an AC source, according to the present invention, to have a flat or positive spring rate; and FIG. 2 shows an implementation of a control for achieving a flat or positive spring rate, according to the present invention.

BEST MODE FOR CARRYING OUT THE INVENTION

Figure 3B:
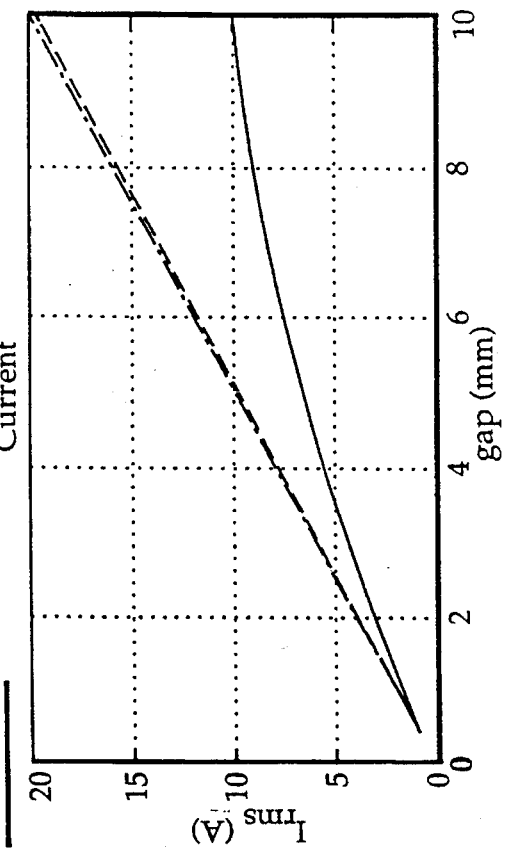
FIGS. 3(a), (b), (c) and (d) show force, current, airgap potential and flux density, respectively, versus airgap for a force command voltage $V_0$=150 V and both with and without current feedback for illustrating both flat and negative spring rates.
Figure 3C:
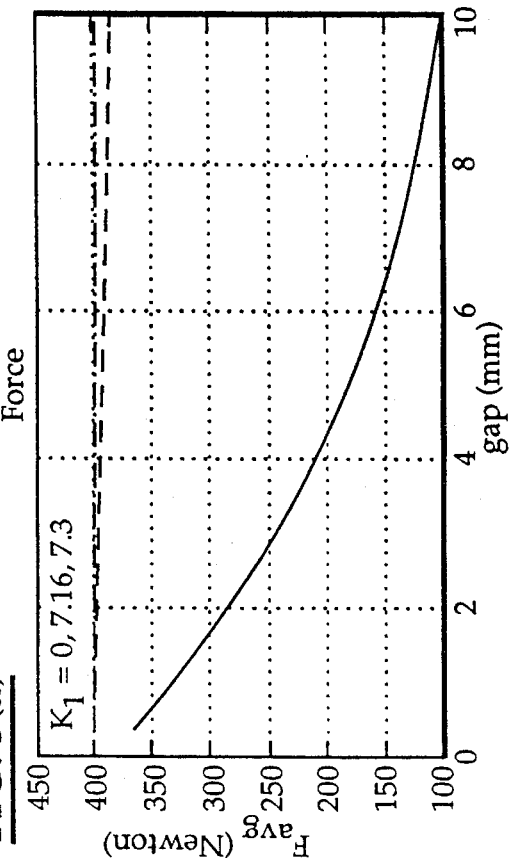
Figure 3C:
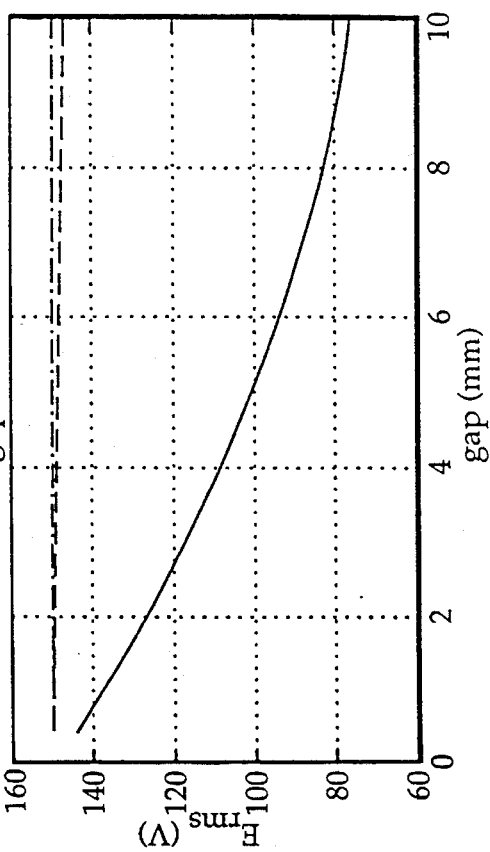
Figure 3D:
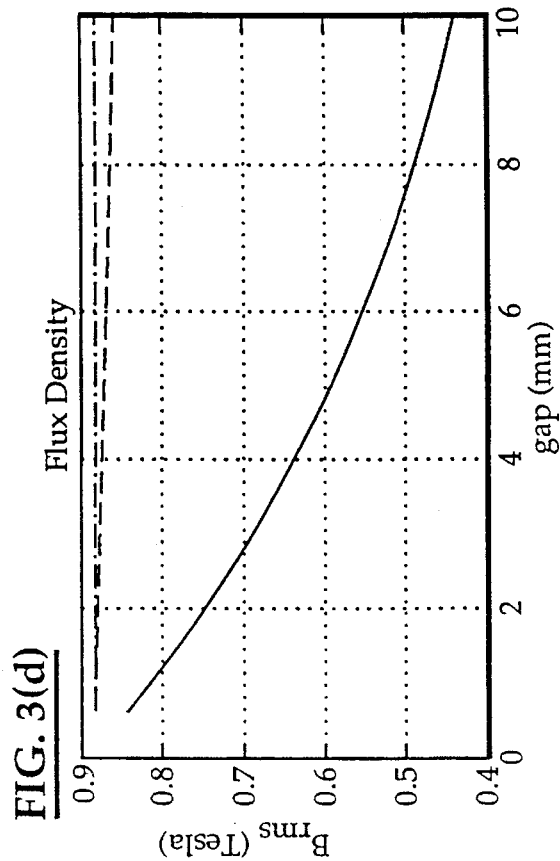

FIG. 1 shows an electromagnet actuator 10 having a coil comprising a leakage inductance ($L_1$) 12 and a main inductance (L) 14 for providing a force in response to a current (I) provided by an alternating current source 16. A resistance (R) 17 is the resistive component of the impedance of the coil. The electromagnet 10 has an air gap (g) between a core 18 and a reaction plate 19. The inductance of the coil 14 associated with the electromagnet 10 is a function of the size of the gap. It is an important teaching of the present invention that the force characteristic provided by the electromagnet 10 may be made substantially independent of the air gap size. This is accomplished by providing the voltage from the source 16 in a way that varies according to the relation $$V = \sqrt{2}\ (V_0 + K_1\ |I|) \sin \omega t \qquad (1)$$

where V is sinusoidal at angular frequency ω, i.e., where $V_0$ and $K_1$ are constants and where I equals the instantaneous RMS current.

The RMS applied voltage V is given by $$V = V_0 + K_1\ |I| \qquad \ldots (2)$$

where I equals the RMS current through the magnet. Using Ampere's law and well known electromagnetic concepts, it is possible to show that the RMS airgap flux density B is given by $$B = \frac{\mu_o N I}{2g} \qquad (3)$$

where $\mu_0 = 4\pi \cdot 10^{-7}$ H/m (permeability of free space), g=airgap, and N=turns on coil.

The airgap inductance L is given by $$L = \frac{\mu_o N^2 A}{2g}, \qquad (4)$$

where A equals the cross-sectional area of the magnet core.

The average force is given by $$F_{avg} = \frac{I^2 L}{2g} \quad (5)$$

The absolute value of the RMS current |I| is determined now. Motional effects are very small and thus |I| is given by $$|I| = \frac{V}{\sqrt{R^2 + (\omega(L+L_1))^2}} \quad (6)$$

Eq. (2) is now substituted into Eq. (6) and |I| is solved for as follows:

$$|I| = \frac{V_0}{\sqrt{R^2 + \omega(L+L_1))^2} - K_1} \quad (7)$$

$K_1$ is chosen such that |I| is not affected by $L_1$ (the leakage inductance). When R=0, $$K_1 = \omega L_1 \quad \ldots (8a)$$

To account for R, $$K_1 \geq \omega L_1 \quad \ldots (8b)$$

Note that an electromagnet excited by a pure (stiff) AC voltage source has a force of attraction that is independent of airgap, provided R=0 and $L_1$=0. This condition defines a zero spring rate. When R=0 and $L_1 \neq 0$, Equation (8a) should be applied to get a zero spring rate. When neither $L_1$ nor R are zero, expression (8b) gives the condition, according to the teachings hereof, for obtaining a zero or positive spring rate.

The airgap potential E is useful in checking the performance of a design. E is given by $$E = |I|\omega L \quad \ldots (9)$$

The force as a function of $V_0$ when $K_1 \approx \omega L_1$ may be approximated as follows: From Eq. (7)

$$|I| \approx \frac{V_0}{\omega L} \quad (10)$$

Substitution of Eq. (10) into (5) and use of Eq. (4) gives $$F_{avg} \approx \frac{V_0^2}{\mu_0 \omega^2 N^2 A} , \quad (11)$$

which shows that when Equation (8a) is met approximately, the force is essentially independent of airgap. Further, the magnitude of the force is controllable as a function of $V_0^2$.

FIG. 2 shows a control circuit 20 applying these teachings for controlling the voltage provided by a source 22 to an electromagnet actuator 24. The control circuit includes a device 26 for altering the voltage level provided on a line 28 from the source 22. This may be a solid state relay such as a triac or may be inverse-parallel silicon control rectifiers (SCRs), a saturable reactor, or a high-frequency pulse-width modulated (PWM) single-phase inverter, among others. The pulse-width modulated approach would permit use of much higher frequencies for the fundamental excitation of the electromagnet and may be desirable to minimize vibrations in some applications. However, such an approach would be more expensive.

The device 26 as embodied by a triac is responsive to a phase control circuit 30 which provides a control signal on a line 32 to control the point of which current is turned on and off for chopping the current, i.e., turning the current on and off, thereby effectively changing the average voltage provided on a line 34. The signal on the line 34 may be provided to a sensor 36 such as a current sensor for providing a sensed signal on a line 38. This is for the purpose of feeding back a sensed RMS current signal for comparison with a dictated current level to provide a flat or positive force vs. gap characteristic (spring rate) to be described below.

The signal on the line 34, after being sensed, is provided on a line 40 to the electromagnet 24 which is represented as an impedance comprising a leakage inductance 42 (similar to $L_1$ in FIG. 1) and labeled $L_{LEAK}$, a main inductance 44 (similar to L in FIG. 1) and labeled $L_{GAP}$, and a resistance 46. The current on the line 34 and 40 passes through the electromagnet 24 and is provided on a line 48 back to the source 22.

The sensed current on the line 38 may be provided to a rectifier 50 which may include a lag filter for providing a rectified and lag filtered signal on a line 52 to a gain circuit 54 which provides an amplification at a selected level such as $K_1$, as shown, and similar to the constant $K_1$ already discussed above. The amplifier 54 provides an amplified signal on a line 56 to a summer 58 which is also responsive to a constant bias signal on a line 60 designated $V_0$. This may be viewed as a dictated force command signal which, it should be understood, need not be constant and may be changed according to a change in a desired force. The summed signal on the line 62 is provided to the phase control circuit 30 for commanding a desired level of chopping of the signal on the line 28 to provide the dictated force level.

Explanation of Gap Determination

With $K_1 \approx \omega L_1$, Equation (7) may be approximated by $$|I| \approx \frac{V_0}{\omega L} \quad (10)$$

Substituting Eq. (4) into (10) and solving for g, we obtain $$g \approx \left[ \frac{\mu_0 \omega N^2 A}{2} \right] \cdot \frac{|I|}{V_0} \quad (12)$$

For example, $\mu_0 = 4\pi \cdot 10^{-7}$ H/m,
$\omega = 2\pi \cdot 60$,
N=700,
A=1" sq. $= 2.54^2 \cdot 10^{-4}$ m$^2$, and
$V_0 = 150$, then $$g = \frac{74.9}{V_0} \cdot |I| \quad (13)$$

where $|I| = I_{rms}$, a scalar quantity.

For $V_0 = 150$ FIGS. 3(a)–(d), $g \approx 0.5$ |I|;
For $V_0 = 75$ FIGS. 4(a)–(d), $g \approx$|I|. Comparing the $I_{rms}$ vs. gap graphs for these two cases in FIGS. 3(b) and 4(b), for $K_1 = 7.16$, shows the approximations are close to predictions made by more accurate methods. These methods and results are discussed below.

In any event, using the teachings of Equation (12), a divide circuit 64 may be provided, as shown in FIG. 2, to provide an air gap signal on a line 66 having a magnitude indicative of the size of the air gap in the electromagnet. The divide circuit is responsive to the rectified sensed current signal (|I|) on the line 52 and the dictated force signal ($V_0$) on the line 60 for dividing the rectified sensed current signal on the line 52 by the dictated force signal on the line 60. This may be carried out using an inexpensive analog divide chip and appropriate scaling to provide the signal on the line 66 proportional to air gap, as in Equation (12).

In further accord with the teachings of the present invention, flux sensing coil 68 may be provided to sense the flux of the electromagnet in the air gap. The sense coil may provide a sensed flux signal on a line 70 to the phase control circuit 30 to correct for saturation in a highly saturated system, for example.

Thus the circuit of FIG. 2 is an implementation of the present invention where a force provided by an electromagnet is controlled by a variable voltage on a line 34 to provide a force that is independent of the air gap of the electromagnet.

It should be realized, according to the present invention, that the selection of the value of the constant $K_1$ used in the amplification circuit 54 of FIG. 2 is critical to achieving the desired force characteristic that is essentially independent of the air gap, having a zero spring rate or, even a positive spring rate. The key is to make the magnitude of $K_1$, greater than or equal to $\omega L_1$, i.e., $\omega$ times the leakage inductance. We will now return to the examples of FIGS. 3, 4 and 5, (a)–(d), for a system in which the constant $K_1$ was selected to have different values. The dimension of $K_1$ is ohms.

As mentioned above, a negative spring rate for a force generator makes it more difficult to use in a control system than one with a flat zero spring rate or positive spring rate. For example, an electromagnet without stabilization cannot be used to levitate a mass. A magnet with positive spring rate can successfully levitate an iron mass.

The force level when made independent of gap by application of Equation (8a), and according further to the present invention, is adjusted by varying $V_0$:

$$\text{Force} \approx \frac{V_0^2}{\mu_0 \omega^2 N^2 A} = 0.0177 \, V_0^2 \text{ (for example)} \quad (14)$$

In the curves shown in FIGS. 3, 4 and 5, (a)–(d), the force ($F_{avg}$), RMS current ($I_{RMS}$), RMS gap voltage ($E_{RMS}$) (cannot be measured directly) and RMS flux density ($B_{RMS}$) are shown in the subfigures labelled (a), (b), (c), and (d), respectively. The control scheme of FIG. 2 linearizes the RMS current versus gap characteristic, thus making the force independent of gap.

The concepts described to this point are now illustrated using the graphs shown in FIGS. 3–5, (a)–(d). The MATLAB computer program shown in the appendix was used to generate the data using Equations (2)–(9).

The magnet considered has a cross-sectional area of 1.0 sq. inch (645 sq. mm). There are 700 turns and the magnet operates at a frequency of 60 Hz. The leakage inductance is 19 mH. The coil resistance is 2.07 Ohms. The force command voltage=150 V unless noted otherwise.

Figure 4A:
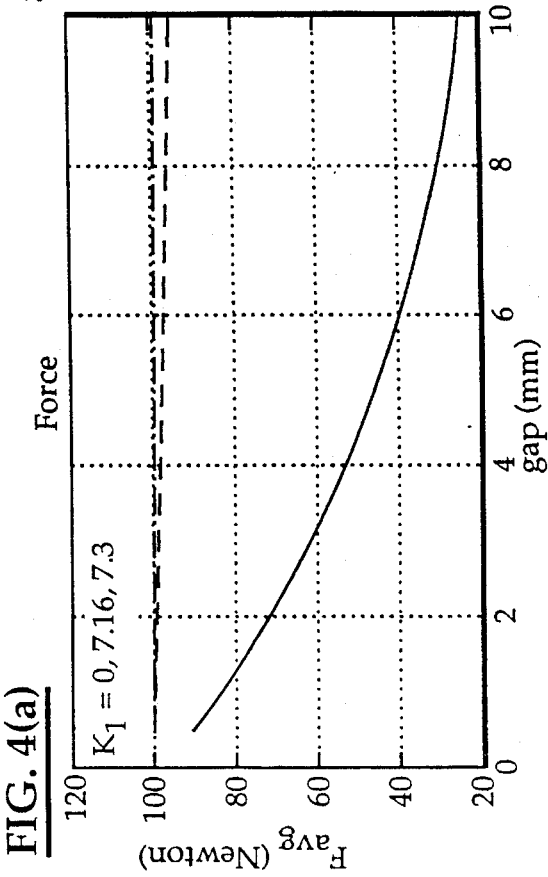
FIGS. 4(a)–(d) are similar to FIGS. 3(a)–(d), except that the force command voltage $V_0$ was reduced from 150 V to 75 V.
Figure 4B:
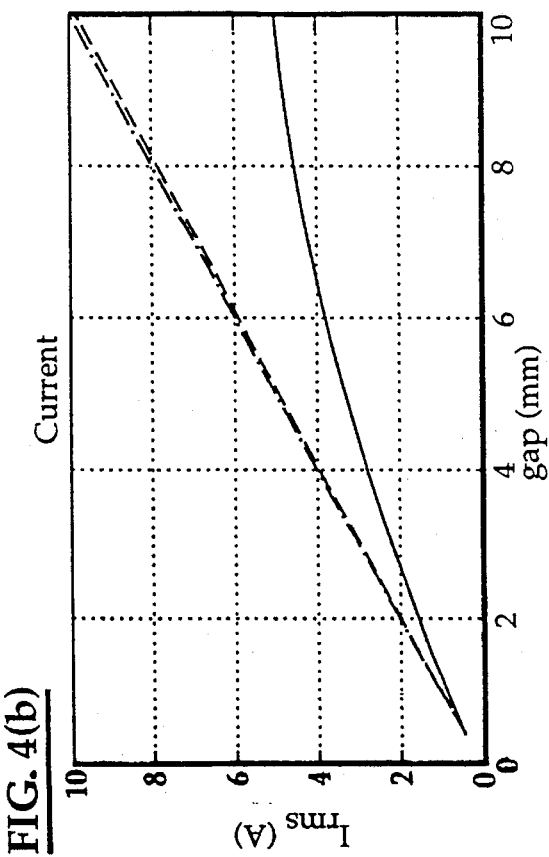
Figure 4C:
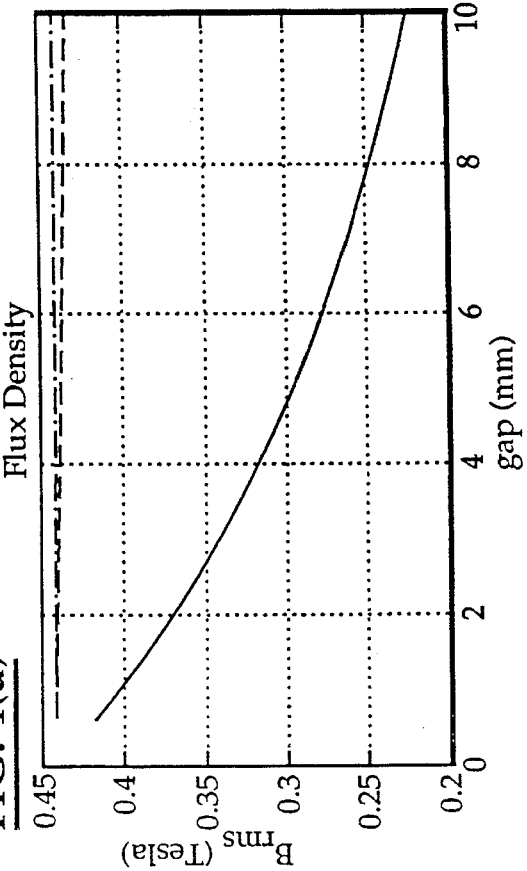
Figure 4D:
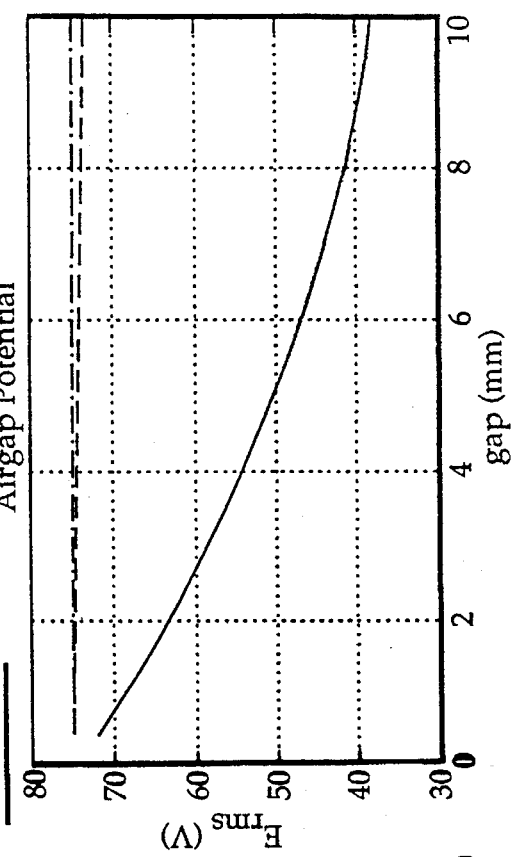
Figure 5B:
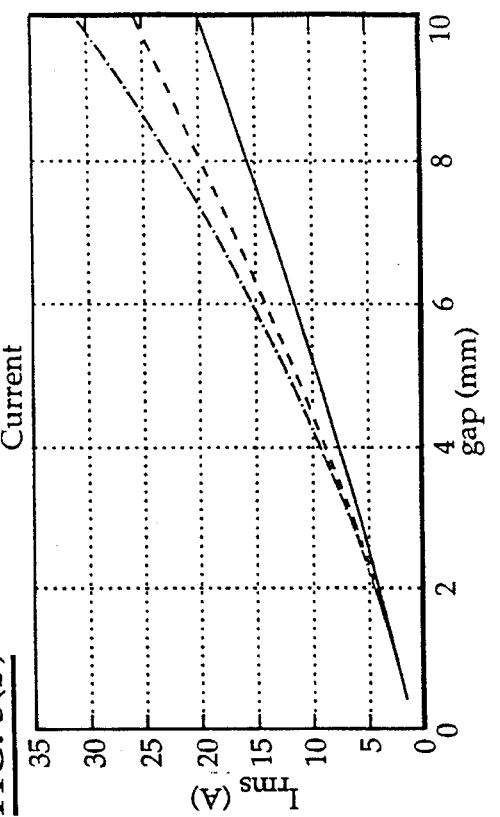
FIGS. 5(a)–(d) are similar to FIGS. 3(a)–(d) and FIGS. 4(a)–(d), except having a non-zero $K_1$ parameter for all three curves, i.e., having current feedback in the phase control loop, for illustrating both flat and positive spring rates.
Figure 5A:
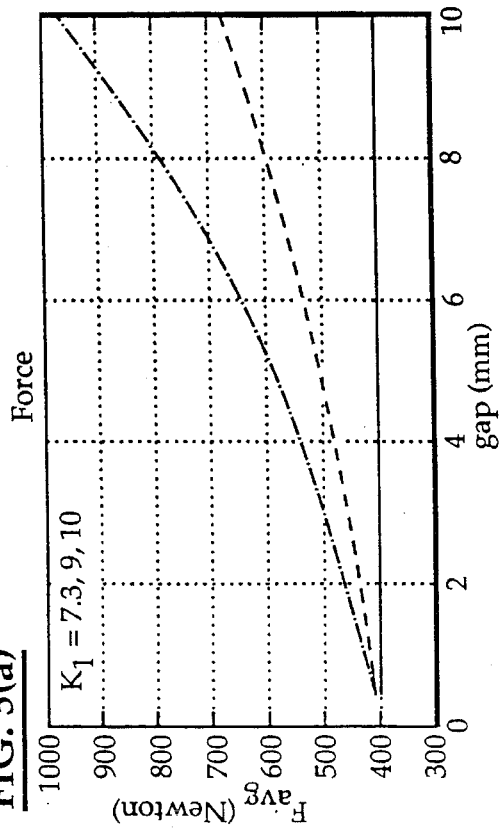
Figure 5C:
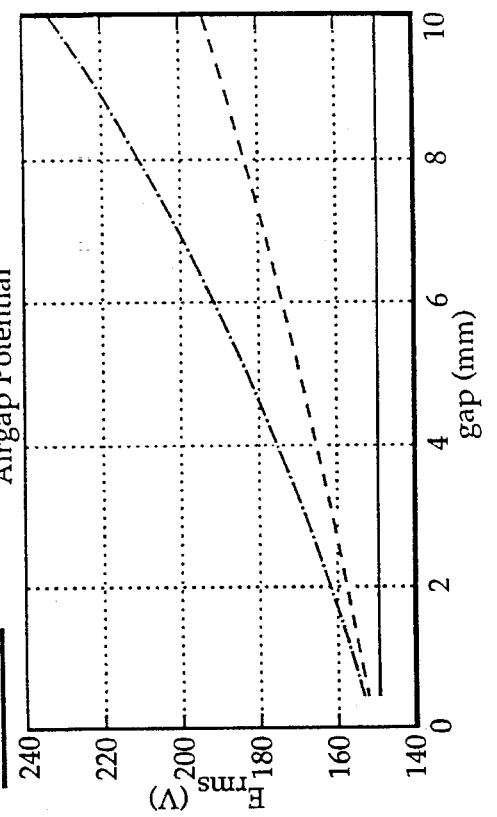
Figure 5D:
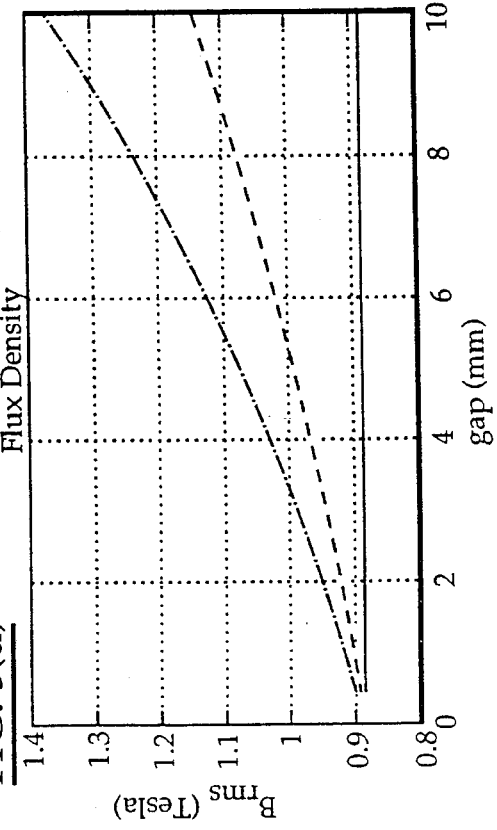

FIGS. 3(a), (b), (c) and (d) show Force, Current, Airgap Potential, and Flux Density, respectively versus airgap. Each graph panel (a), (b), (c), and (d) has three curves. These correspond to various values of the parameter $K_1$. $K_1=0$ is the situation with no current feedback and is shown by the solid curve in all the graphs of FIGS. 3 and 4, (a)–(d). The Favg vs. gap curve for $K_1=0$ exhibits a negative spring rate (force decreases with distance) as shown in both FIG. 3(a) and FIG. 4(a). With no resistance present a value of $K_1=\omega*L_1=7.16$ should result in a force that is independent of gap. However, because of coil resistance, a dashed line curve for that value of $K_1$ exhibits a slight negative spring rate as shown in FIGS. 3(a) and 4(a). By going to $K_1=7.3$, Favg=400 N, virtually independent of gap. With good stabilization ($K_1=7.3$), the Irms vs. gap dot-dash line curve of FIGS. 3(b) and 4(b) becomes essentially linear. This is what permits finding the gap by dividing the current by the force command voltage $V_0$ (see Eq. 12). Flux density and airgap potential dot-dash line curves in FIGS. 3(d) and 3(c) become flat (invariant) with good compensation.

FIGS. 4(a)–(d) are similar to FIGS. 3(a)–(d) except that the force command voltage $V_0$ was reduced from 150 to 75 volts. The force with $K_1=7.3$ drops from 400 to 100 N. This in accordance with Eq. 14. The significance of FIGS. 4(a)–(d) is that it demonstrates $K_1$ can indeed be a constant parameter. It is especially important, according to the teachings hereof, that $K_1$ is independent of the force command voltage $V_0$.

Having force independent of gap simplifies use of electromagnets as forcers in control systems. Sometimes, a positive spring rate is desirable. By taking $K_1=9$ or 10, a significant positive spring rate can be developed. This is illustrated in FIGS. 5(a)–(d) which are similar to FIGS. 3(a)–(d) and 4(a)–(d) except having a non-zero value for $K_1$, i.e., having current feedback in the phase control loop as shown in FIG. 2 at the summing junction 58. Curves are shown for $K_1=7.3$ (solid curve with flat response) and for $K_1=9$ (dashed curve) and 10 (dot-dash curve). Note that the spring rates are "hard." The slopes of the Favg curves increase with gap and are positive. Such a magnet system could be used directly to hold up (i.e., levitate) a magnetic object with no contact to the object.

The technique taught here requires no separate position sensors. In fact, from $V_0$ and the RMS current, using the exemplary values described above, the gap may be determined as previously indicated in Equation (13) as follows:

$$\text{GAP (millimeter)} \equiv (74.9/V_0)I_{RMS}.$$

Practical realization of the invention is possible in many different embodiments. A very simple and inexpensive realization was shown previously in FIG. 2. It is accomplished using a pair of inverse-parallel SCRs or a triac and a Hall-effect current sensor. It can be powered directly off a 120 VAC or 240 VAC 60 cycle power line. The phase control circuit for the triac should be configured to produce an RMS current (voltage) that is linearly related to the control signal.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

APPENDIX

```
clear
clg
% DATA
area = 2.54   2*1e-4    ;%area of coil core
nturn = 700             ;%number of coil turns
lleak = .019            ;%leakage inductance
rcoil = 2.07            ;%magnet coil resistance
V0 = 150                ;%base applied rms voltage
K1 = 1.0                ;%feedback constant (Ohms)
freq = 60               ;%frequency K1 approx = 2*pi*freq*lleak
u0 = 4*pi*1e-7          ;%H/m
```

-continued

```
%
w = 2*pi*freq;
w2 = w    2;
%compute avg force, rms current as function of gap
%K1 = input('feedback constant K1 = ') ;
%
for k = 1:3,
K1(1) = 7.3;
K1(2) = 9;
K1(3) = 10;
for i = 1:20,
    gap(i,k) = 0.0005*i;
    l(i,k) = u0*nturn-2*area/(2*gap(i,k));
    Irms (i, k) = V0/(sqrt (rcoil    2 + (w*(l(i, k) + lleak)
        2) - K1(k));
    Favg (i, k) = Irms (i, k)    2*l(i, k)/(2*gap (i, k));
    Brms(i, k) = u0*nturn*Irms(i,k)/(2*gap(i, k));
    Erms(i, k) = Irms(i,k)*w*l(i, k);
    gapmm(i, k) = gap(i, k)*1000;
end
end
%
subplot(221), plot(gapmm, Favg)
grid
title('Force')
xlabel('gap (mm)')
ylabel('Favg (Newton)')
subplot(222), plot(gapmm, Irms)
grid
title('Current')
xlabel('gap (mm)')
ylabel('Irms (A)')
subplot(223), plot(gapmm, Brms)
grid
title('Flux Density')
xlabel('gap (mm)')
ylabel('Brms (Tesla)')
subplot(224), plot(gapmm, Erms)
grid
title('Airgap Potential')
xlabel('gap (mm)')
ylabel('Erms (V)')
```

I claim:

1. Apparatus, comprising:

a voltage control, responsive to a time varying voltage source signal and a control signal, for providing a voltage controlled current signal;

an electromagnet having a leakage inductance and a main inductance that varies according to a gap associated with the electromagnet, responsive to the voltage controlled current signal, for providing a force;

a current sensor, responsive to the voltage controlled current signal for providing a sensed current signal;

a rectifier, responsive to the sensed current signal, for providing a rectified current signal;

an amplifier, responsive to the rectified current signal, for providing an amplified signal;

a summer, responsive to the amplified signal and to a dictated force signal, for providing a summed signal; and a control, responsive to the summed signal, for providing the control signal.

2. The apparatus of claim 1, wherein the voltage source signal is sinusoidal having an angular frequency and wherein the amplifier has a gain having a magnitude greater than or equal to the angular frequency times the leakage inductance.

3. The apparatus of claim 1, further comprising a flux sensor for sensing flux provided by the electromagnet and for providing a sensed flux signal, wherein the control is responsive to the sensed flux signal for providing the control signal corrected for saturation.

4. The apparatus of claim 1, further comprising a divider, responsive to the rectified current signal and to the dictated force signal, for providing a gap signal.

5. A force control for an electromagnet having a leakage inductance and a main inductance related to the size of an airgap, the electromagnet powered by current from a sinusoidal source having a fixed angular frequency, comprising:

a voltage control, responsive to the current from the sinusoidal source and to a control signal, for providing a voltage-controlled current; and a phase control, responsive to a dictated force signal and to a feedback signal having a magnitude indicative of a root-mean-square value of the voltage-controlled current scaled by a factor having a magnitude greater than or equal to the angular frequency of the sinusoidal source times the leakage inductance wherein forces provided by the electromagnet are made to increase or remain constant with increasing airgap.

6. The apparatus of claim 5, further comprising a flux sensor for sensing flux provided by the electromagnet in the airgap and for providing a sensed flux signal, wherein the phase control is responsive to the sensed flux signal for providing the control signal corrected for saturation.

7. The apparatus of claim 5, further comprising a divider, responsive to the root-mean-square value of the voltage controlled current and to the dictated force signal, for providing an airgap signal having a magnitude indicative of a size of the airgap.

8. A method, comprising the steps of:

providing alternating current at an angular frequency to an electromagnet force actuator having a leakage inductance; and controlling the alternating current for providing a controlled current according to a voltage reference signal modified by a feedback signal indicative of the controlled current and amplified at a gain factor having a magnitude greater than or equal to the leakage inductance times the angular frequency, whereby the electromagnet has a flat or positive spring rate.

* * * * *